United States Patent [19]

Nachtkamp et al.

[11] Patent Number: 4,608,413
[45] Date of Patent: Aug. 26, 1986

[54] AQUEOUS POLYURETHANE STOVING LACQUERS AND THE USE THEREOF FOR THE PRODUCTION OF LACQUER FILMS AND COATINGS

[75] Inventors: Klaus Nachtkamp, Cologne; Jürgen Schwindt, Leverkusen; Karl-Ludwig Nobel, Cologne; Hans-Georg Stahl, Oldenburg, all of Fed. Rep. of Germany

[73] Assignee: Bayer Aktiengesellschaft, Leverkusen, Fed. Rep. of Germany

[21] Appl. No.: 679,679

[22] Filed: Dec. 7, 1984

[30] Foreign Application Priority Data

Dec. 15, 1983 [DE] Fed. Rep. of Germany ....... 3345448

[51] Int. Cl.$^4$ .................. C08L 75/08; C08L 75/06; C08K 3/20; C09D 3/72
[52] U.S. Cl. ................................. 524/591; 524/840
[58] Field of Search ................... 524/591, 840

[56] References Cited

U.S. PATENT DOCUMENTS

| | | | |
|---|---|---|---|
| 3,479,310 | 11/1969 | Dieterich | 524/591 |
| 3,730,927 | 5/1973 | Schloss | 524/591 |
| 4,028,313 | 6/1977 | Muller et al. | 260/77.5 |
| 4,098,933 | 7/1978 | Burkhardt et al. | 427/379 |
| 4,123,423 | 10/1978 | Wenzel et al. | 528/71 |
| 4,284,544 | 8/1981 | Wegner | 524/839 |
| 4,299,868 | 11/1981 | Berndt | 524/591 |
| 4,322,327 | 3/1982 | Yoshimura | 524/839 |
| 4,403,085 | 9/1983 | Christenson et al. | 528/45 |
| 4,433,017 | 2/1984 | Goto et al. | 528/45 |
| 4,452,834 | 6/1984 | Nachtkamp et al. | 427/379 |
| 4,460,738 | 7/1984 | Frentzel | 524/591 |
| 4,501,852 | 2/1985 | Markusch | 524/591 |

FOREIGN PATENT DOCUMENTS

| | | |
|---|---|---|
| 0022452 | 4/1980 | European Pat. Off. . |
| 2708611 | 5/1978 | Fed. Rep. of Germany . |
| 1524276 | 9/1978 | United Kingdom . |
| 1530022 | 10/1978 | United Kingdom . |

Primary Examiner—C. Warren Ivy
Attorney, Agent, or Firm—Gene Harsh; Joseph C. Gil; Thomas W. Roy

[57] ABSTRACT

The present invention is directed to aqueous stoving lacquers containing pigments or fillers wherein the binders are based on combinations of (a) polyurethane prepolymers containing partly or completely neutralized carboxyl groups and blocked isocyanate groups and (b) polyurethane prepolymers containing free hydroxyl groups and partly or completely neutralized carboxyl groups. The binder components are further characterized by polyester and polyether segments, each being present in amounts of greater than 10% by weight.

The present invention is also directed to films and coatings prepared from these aqueous stoving lacquers.

6 Claims, No Drawings

AQUEOUS POLYURETHANE STOVING LACQUERS AND THE USE THEREOF FOR THE PRODUCTION OF LACQUER FILMS AND COATINGS

BACKGROUND OF THE INVENTION

1. Field of the Invention

This invention relates to new polyurethane stoving lacquers which are dissolved or dispersed in a predominantly aqueous medium, and to the use thereof for the production of lacquer films and coatings.

2. Description of the Prior Art

Those lacquers wherein the solvent is based partly or completely on water are becoming increasingly important in technology for reasons of pollution control and for saving organic solvents which are dependent on petroleum. Attempts have been made for a long time to produce aqueous lacquers which are to be equal in their properties to lacquers dissolved in organic solvents. Up until now, it has been impossible to fully achieve this objective. For this reason, aqueous lacquers, apart from cationic electrophoretic enamels, are only used to a limited extent for the production of high-grade lacquers.

One of the main problems which arise when aqueous lacquer systems are used is the poor pigmenting ability thereof. In the case of pigment contents which are required to achieve a good covering power, water lacquers usually lose their gloss. The other properties in terms of lacquering, for example elongation, impact elasticity, adhesion and corrosion prevention, also frequently deteriorate as the pigmenting increases.

In order to overcome these problems of pigmenting, it is proposed in DE-AS No. 2,507,884 to dissolve polyacrylate or polyester lacquer binders which contain carboxyl groups in low-boiling organic solvents before they are dispersed in water, and to work the pigments into this solution. The organic pigment dispersion which is produced in this manner is dispersed in water once the carboxyl groups have been neutralized, and the organic solvent is removed by azeotropic distillation. This method suffers from various disadvantages. First of all, the detour via the organic pigment dispersion with subsequent azeotropic distillation represents a considerably increased technical expense compared to the conventional operation for lacquers. Secondly, the pigmenting restricts the manufacturer's ability to alter the formulation of the lacquers to the time before the lacquer is converted into an aqueous dispersion, because once the mixture had been dispersed, the pigmenting thereof cannot be changed.

Thus, an object of the present invention is to provide an aqueous lacquer system which does not suffer from the above-mentioned pigmenting problems. In the aqueous phase, it should be able to be mixed with the quantities of pigments which are required to achieve an effective covering power according to the methods conventional in lacquer technology and, after being applied in a conventional manner, it should produce lacquers which have a good gloss and which are distinguished by good elongation, good adhesion and an effective corrosion prevention with a high hardness level.

This object may be achieved by providing the lacquer systems according to the present invention which are described in more detail in the following. This invention is based on the surprising observation that aqueous solutions or dispersions of heat-hardenable mixtures of polyurethane prepolymers containing carboxylate groups and blocked isocyanate groups and polyurethane prepolymers containing carboxylate groups and hydroxyl groups are not affected by the pigmenting problems described above if these polyurethane prepolymer mixtures contain specific polyether segments which are defined in more detail in the following, in addition to specific polyester segments which are also defined in more detail in the following.

The fact that the good pigmenting ability of the products according to the present invention is actually unusual for aqueous lacquer systems is also revealed by comparative experiments with conventional polyurethane dispersions, for example with the thermally cross-linkable water lacquers which may be obtained according to EP-OS No. 75 775 and which contain polyurethane-polyureas having carboxylate groups and hydrophobic blocked polyisocyanates.

Combinations of water-soluble or water-dispersible blocked polyisocyanates which contain carboxylate groups and water-soluble or water-dispersible organic compounds which have isocyanate-reactive hydrogen atoms are known in principle and are described in DE-PS No. 2,456,469. However, this patent does not disclose the measures which are essential to the present invention, which require combining selected water-soluble or water-dispersible NCO-prepolomers having blocked isocyanate groups with specific water-soluble or water-dispersible polyurethane prepolymers having alcoholic hydroxyl groups, whereby specific polyether or polyester segments must be present in a chemically incorporated form in the above-mentioned components.

Furthermore, DE-OS No. 2,642,073 describes specific hydrophilic polyurethane prepolymers which may contain carboxylate groups and blocked isocyanate groups, inter alia, and are dispersed in water as solids. The coatings produced therefrom are self-cross-linking, i.e., they are not used in a combination with reaction components.

The two above-mentioned patents do not discuss the pigmenting of the coating agents. Therefore, they naturally do not contain any references to measures for alleviating pigmenting problems.

A few later publications also relate to polyurethane prepolymers which contain carboxylate groups and blocked isocyanate groups, and to the use thereof for the production of aqueous lacquers (DE-OS No. 2,708,611, EP-PS No. 22 452 and U.S. Pat. No. 4,403,085). However, the measures which are essential to the present invention to achieve a good pigmenting ability are not described in these publications, especially since no disclosure is directed to the pigmenting of the aqueous lacquer systems presented therein.

Finally, DE-OS No. 3,234,590 describes water-soluble urethane prepolymers having blocked isocyanate groups and containing ionic groups, for example carboxylate groups, which are suitable as adhesives and impregnating agents. A combination of these blocked isocyanates with reaction components of the type to be used according to the present invention for the production of lacquers is not described. Consequently, that patent application is also not directed to the pigmentation of lacquers.

SUMMARY OF THE INVENTION

The present invention provides aqueous stoving lacquers containing pigments and/or fillers, and combinations of
(a) polyurethane prepolymers containing partly or completely neutralized carboxyl groups and blocked isocyanate groups with
(b) polyhydroxyl compounds containing partly or completely neutralized carboxyl groups,
as the essential binder and optionally other auxiliaries and additives characterized in that binder component (a) contains a polyether- and/or polyester urethane prepolymer having an average functionality, based on the blocked NCO-groups, of about 1.8 to 5, and an average molecular weight of about 500 to 10,000 which may be calculated from the stoichiometry of the starting materials, with a content of blocked isocyanate groups (calculated as NCO) of about 2 to 15% by weight, a content of urethane groups (calculated as —N—H—CO—O—) of about 5 to 30% by weight, and a content of incorporated, at least partly neutralized carboxyl groups of about 10 to 180 milliequivalents per 100 g of solids,
and
binder component (b) contains a polyether- and/or polyester urethane prepolymer containing free alcoholic hydroxyl groups and having an average hydroxyl functionality of about 1.8 to 5 and an average molecular weight of about 500 to 10,000 which may be calculated from the stoichiometry of the starting materials, with a content of alcoholic hydroxyl groups of about 0.5 to 10% by weight, a content of urethane groups of about 5 to 30% by weight and a content of incorporated, at least partly neutralized carboxyl groups of about 10 to 180 milliequivalents per 100 g of solids, and
(i) the components (a) and (b) are present in quantities corresponding to an equivalent ratio of blocked isocyanate groups in (a) to hydroxyl groups in (b) of about 0.6:1 to 2:1,
(ii) the total quantity of the carboxyl groups and the degree of neutralization thereof is calculated so that the solubility or dispersibility of the binder in water is ensured,
(iii) there are polyether segments as well as polyester segments incorporated in the combinations of the binder components (a) and (b), and the total quantity of the above-mentioned segments amounts to at least 10% by weight in each case, based on the combination of (a) and (b), and
(iv) the above-mentioned polyether segments contain to at the most 10% by weight of ethylene oxide units —$CH_2$—$CH_2$—O—.

This invention also provides the use of the aqueous stoving lacquers according to the present invention for the production of lacquer films and coatings.

DETAILED DESCRIPTION OF THE INVENTION

The binders of the aqueous stoving lacquers according to the present invention are produced from (a) polyurethane prepolymers containing carboxyl(ate) groups, and having (on a statistical average) at least 1.8, preferably at least 2 terminal and/or lateral blocked isocyanate groups, and (b) polyurethane prepolymers containing carboxyl(ate) groups and having (on a statistical average) at least 1.8, preferably at least 2 terminal and/or lateral hydroxyl groups.

The starting materials for the production of component (a) are as follows:

1. any organic polyisocyanates, preferably diisocyanates corresponding to the formula $$Q(NCO)_2$$

wherein Q represents an aliphatic hydrocarbon radical having from 4 to 12 carbon atoms, a cycloaliphatic hydrocarbon radical having from 6 to 15 carbon atoms, an aromatic hydrocarbon radical having from 6 to 15 carbon atoms or an araliphatic hydrocarbon radical having from 7 to 15 carbon atoms.

Examples of such diisocyanates which are preferably to be used include the following: tetramethylene diisocyanate, hexamethylene diisocyanate, dodecamethylene diisocyanate, 1,4-diisocyanatocyclohexane, 3-isocyanatomethyl-3,5,5-trimethylcyclohexyl isocyanate (isophorone diisocyanate), 4,4'-diisocyanatodicyclohexylmethane, 4,4'-diisocyanatodicyclohexylpropane-(2,2), 1,4-diisocyanatobenzene, 2,4- or 2,6-diisocyanatotoluene, or mixtures of these isomers, 4,4'- or 2,4'-diisocyanatodiphenylmethane, 4,4'-diisocyanatodiphenylpropane-(2,2), p-xylylene diisocyanate and α,α,α',α'-tetramethyl-m- or p-xylylene diisocyanate, and mixtures of these compounds.

Of course, it is also possible to (simultaneously) use the higher functional polyisocyanates known per se in polyurethane chemistry, or known modified polyisocyanates which contain, for example carbodiimide groups, allophanate groups, isocyanurate groups, urethane groups and/or biuret groups. Examples of such higher functional polyisocyanates include tris-(6-isocyanatohexyl)-biuret, optionally in admixture with its higher homologues; tris-(6-isocyanatohexyl)isocyanurate, optionally in admixture with its higher homologues as it may be obtained according to DE-OS No. 2,839,133 by trimerizing hexamethylene diisocyanate; and other polyisocyanates of the prior art which contain isocyanurate groups and which may be obtained by trimerizing aliphatic and/or aromatic diisocyanates such as isophorone diisocyanate, diisocyanatotoluene and hexamethylene diisocyanate. Polyisocyanates which may be used very effectively also include the known polyisocyanates containing urethane groups, as may be obtained, for example by reacting excess quantities of 2,4-diisocyanatotoluene or of isophorone diisocyanate with polyhydric alcohols having a molecular weight range of from about 62 to 300, in particular with trimethylol propane, and by subsequently removing the unreacted diisocyanate excess by distillation.

When the above-mentioned higher functional polyisocyanates are simultaneously used, the quantity thereof is calculated so that the maximum functionality, which is stated below, of the resulting blocked polyurethane prepolymers is not exceeded.

It is possible to just use higher functional polyisocyanates as isocyanate units for the prepolymers according to the present invention if, for example sufficient quantities of monofunctional synthesis components having active hydrogen atoms are used at the same time.

2. Polyether polyols and/or polyester polyols of the type known per se in polyurethane chemistry, preferably polyether diols and/or polyester diols having molecular weights of from about 300 to 2000. The polyethers which are of concern and contain hydroxyl groups are produced, for example, by the polymerization of cyclic ethers (such as butylene oxide, tetrahydrofuran, styrene oxide and/or epichlorohydrin, and preferably propylene oxide) on their own, for example in the presence of BF$_3$, or by the addition of these compounds, optionally in admixture or successively, to starting components having reactive hydrogen atoms, such as alcohols and amines, for example water, ethylene glycol, propylene glycol-(1,3) or -(1,2), 4,4'-dihydroxydiphenyl propane (bisphenol A) or aniline.

During the production of the polyethers which are suitable according to the present invention, it is also possible to simultaneously use ethylene oxide, but only in quantities such that the polyethers which are used for the synthesis of the stoving lacquers according to the present invention altogether have a maximum content of oxyethylene units of 10% by weight. Greater quantities of ethylene oxide produce lacquers which have a too strongly persistent hydrophilic nature, and thus lead to a high water sensitivity. The polyethers which are used preferably do not contain any ethylene oxide and contain at least 50% by weight of propylene oxide units. Those polyethers which are produced by the addition of propylene oxide to bisphenol A are particularly preferred as polyethers to be used according to the present invention.

The polyesters which are concerned and have hydroxyl groups include reaction products of polyhydric, preferably dihydric and optionally trihydric alcohols with polyvalent, and more preferably divalent dicarboxylic acids. Instead of using the free polycarboxylic acids, the corresponding polycarboxylic acid anhydrides or corresponding polycarboxylic acid esters of lower alcohols may be used to produce the polyesters. It is preferable during the production of the polyester polyols for hexane diol-(1,6) and/or neopentyl glycol to be used as alcohols in a quantity of at least 50 hydroxyl equivalent percent, based on all the polyhydroxyl compounds used in the production of the polyester polyols, and for adipic acid to be used as carboxylic acid, in a quantity of at least 50 carboxyl equivalent percent, based on all the polycarboxylic acids or polycarboxylic acid anhydrides used in the production of the polyester polyester, so that the resulting polyesters contain at least 5% by weight of esterified adipic acid units, hexane diol units and/or neopentyl glycol units. The polyester polyols are more preferably based only on these components mentioned above and in particular only on hexane diol-(1,6) and adipic acid.

Polyester synthesis components which may optionally also be used include alcohols such as ethylene glycol, propylene glycol-(1,2) and -(1,3), butane diol-(1,4), octane diol-(1 8), 2-ethyl-hexane-diol-(1,3), 1,4-bis-hydroxymethylcyclohexane, diethylene glycol, dipropylene glycol, trimethylolpropane, glycerin and pentaerythritol; and carboxylic acids such as succinic acid, suberic acid, azelaic acid, sebacic acid, phthalic acid, isophthalic acid, terephthalic acid tetrahydrophthalic acid, hexahydraphthalic acid, maleic acid, fumaric acid and saturated and unsaturated fatty acids, for example, stearic acid, oleic acid, ricinoleic acid, linoleic acid, ricinenic acid, linolenic acid eleaostearic acid and fatty acid mixtures which are obtained from natural oils such a linseed oil, soya been oil, peanut oil, safflower oil, castor oil and wood oil.

3. Optionally low molecular weight polyols having molecular weights of from 62 to 300. Examples of such polyols which are suitable according to the present invention are the following: ethane diol, propane diol-(1,2), and -(1,3), butane diol-(1,4) and (1,3), pentane diols, hexane diols, octate diols such as 2-ethylhexane diol-(1,3), trimethelolpropane, glycerin and pentaerythritol.

Examples of the above-mentioned polyisocyanate and hydroxyl compounds which are to be used for the production of the binders according to the present invention are described in, for example Higher Polymers, Vol. XVI, "Polyurethanes Chemistry and Technology", by Saunders-Frisch, Interscience Publishers, New York, London, Vol. I, 1962, pages 32–34 and pages 44–54 and Vol. II, 1964, pages 5–6 and 198–199, and in Kunststoff-Handbuch, Vol. VII, Vieweg-Höchtlen, Carl-Hanser-Verlag, Munich, 1966, for example on pages 54 to 71.

4. Hydroxycarboxylic acids and/or salts thereof. Examples of such hydroxycarboxylic acids which are suitable for the production of the binders according to the present invention are as follows: 2,2-bis-(hydroxymethyl)-propionic acid (dimethyloypropionic acid), tartaric acid, hydroxyacetic acid, lactic acid and malic acid. Hydroxy carboxylic acids which are difunctional with respect to the hydroxyl groups are preferably used, and dimethylol propionic acid is particularly preferred. The above-mentioned hydroxycarboxylic acids may be used as such or in the form of the salts obtained by neutralization of the carboxyl group with bases, or in the form of mixtures of the free hydroxy carboxylic acids and salts thereof. Organic or inorganic bases which are suitable for the conversion of the carboxyl groups into carboxylate groups include amines and alkali metal hydroxides or alkali metal carbonates. Organic bases are preferably used. If the above-mentioned hydroxycarboxylic acids are used as carboxylate salts for the production of component (a) according to the present invention, then the bases contained therein must not have any isocyanate-reactive groups, and water of neutralization which may have formed is also to be carefully removed. Therefore, tertiary amines without other functional groups are preferably used in this case as bases. Examples include triethylamine, tributylamine, N,N-dimethylbenzylamine, 1-methylpiperidine and N-methylmorpholine. If the carboxyl groups are neutralized after component (a) has been produced, then of course other bases may be used such as ammonia, N,N-dimethylethanolamine, diethanolamine, N-methyldiethanolamine or triethanolamine. N,N-dimethylethanolamine is particularly preferred in this case.

5. Compounds which are monofunctional with respect to isocyanates and are suitable for the reversible blocking of isocyanate groups, as they are described by, for example Z. W. Wicks in Progress in Organic Coatings, 9, 3–28 (1981). Examples of such blocking agents which are suitable for the production of component (a) according to the present invention include lactams such as ε-caprolactam; oximes such as acetonoxime, methylethylketonoxime (butanonoxime) and cyclohexynonoxime: C-H-acidic compounds such as malonic acid diethylester, acetoacetic ester and acetylacetone; alcohols such as the simple monoalcohols having from 1 to 4 carbon atoms, 2-ethylhexanol, ethylene glycol monoethyl ether and diethylene glycol monomethylether; phenols such as phenol, cresol and xylenol; and heterocyclic compounds such as triazoles, imidazolines, imidazoles and tetrahydropyrimidines.

The blocking agents which have been described may be used on their own or as mixtures. ε-caprolactam, butanonoxime and malonic acid diethylester are preferred blocking agents.

To produce component (a) according to the present invention, the type and ptoportions of the above-mentioned starting materials are selected so that the resulting component (a) preferably has (i) a content of blocked isocyacate groups, calculated as NCO, of from about 2 to 15, preferably from about 3 to 10%, by weight,
(ii) an average functionality, based on the blocked NCO groups, of from about 1.8 to 5, preferably about 2 to 3,
(iii) a content of incorporated, optionally partly or completely neutralized carboxyl groups of from about 10 to 180, preferably from about 20 to 100, milliequivalents per 100 g of solids,
(iv) a content of urethane groups —NH—CO—O— of from about 5 to 30, preferably from about 10 to 20%, by weight, and
(v) an average molecular weight of from about 500 to 10,000, in particular from about 800 to 4000, which may be calculated from the stoichiometry of the starting materials.

Component (a) according to the present invention is produced according to known principles of the prior art. Thus, it is possible in principle to add the above-mentioned reaction components in any sequence. However, a preferred method comprises mixing polyisocyanates, polyether polyols and/or polyester polyols and lower molecular weight polyols in proportions which correspond to a ratio of isocyanane groups to hydroxyl groups of from about 1.05 to 5, preferably from about 1.2 to 3, converting these compounds into prepolymers containing free NCO groups, then blocking some of these NCO groups according to the known prior art processes and finally reacting the NCO groups which are still free with hydroxycarboxylic acids or with salts thereof. One embodiment of the described method which is also preferred is to add some of the blocking agent before the reaction with the hydroxy carboxylic acid, and to add the rest thereafter.

Component (a) may be produced in the melt or in the presence of organic solvents. In the melt, temperatures of up to about 180° C. may be used. In this manner, resins, for example may be produced which solidify in a vitreous manner upon cooling to room temperature and which may be dispersed in water as a solid substance after being crushed analogously to the method of DE-OS No. 2,642,073. For the alternative possibility of simultaneously using solvents, enough organic solvent is generally added for the blocked prepolymer to be effectively stirrable at about 100° C., so that the subsequent dispersion may be carried out by mixing the hot, liquid product with water. In general, quantities of solvent of up to about 10% by weight, based on the solids content of component (a), are adequate for this purpose. Suitable solvents include methylisobutyl ketone, N-methylpyrrolidone, dimethylformamide, ethylene carbonate, ethylene glycol monoethylether acetate, propylene glycol monomethylether acetate, toluene or xylene.

The starting materials for the production of component (b) may be taken from the same selection of compounds which is described in ditail for the production of component (a), with the exception, of course, of the blocking agents.

Thus, the polyisocyanate are as they are described under number 1, the polyether polyols and/or the polyester polyols according to number 2, the low molecular weight polyols according to number 3 and the hydroxy carboxylic acids and amines according to number 4.

In contrast to (a), component (b) contains prepolymers having terminal and/or side alcoholic hydroxyl groups. The type and proportions of the above-mentioned starting materials are therefore selected so that the resulting component (b) has (i) a content of alcoholic hydroxyl groups (OH) of from about 0.5 to 10, preferably from about 1 to 5%, by weight,
(ii) an average functionality, based on the OH groups, of from about 1.8 to 5, preferably about 2 to 3,
(iii) a content of incorporated, optionally partly or completely neutralized carboxyl groups of from about 10 to 180, preferably from about 20 to 100, milliequivalents per 100 g of solids,
(iv) a content of urethane groups —NH—CO—O— of from about 5 to 30, preferably from about 10 to 20% by weight, and
(v) an average molecular weight of from about 500 to 10,000, in particular from about 800 to 4000, which may be calculated from the stoichiometry of the starting materials.

The component (b) according to the present invention is also produced according to known principles of the art. In principle, the above-mentioned reaction components may be added in any sequence. One preferred method comprises introducing the polyhydroxyl components, i.e. the polyether- and/or polyester polyols, the low molecular weight polyols which are optionally used and the hydroxy carboxylic acids which may be partly or completely neutralized, and then adding the polyisocyanates. In so doing, a quantity ratio of polyol components to polyisocyanates is generally observed which corresponds to a ratio of hydroxyl groups to isocyanate groups of from about 1.05 to 5, preferably from about 1.2 to 3. The mixture which has been described is then reacted until all the NCO groups have been converted. As already described for the production of component (a), this reaction may take place in the melt or in the presence of organic solvents. The quantity and type of the solvents to be optionally usec is the same as for component (a).

It is essential to the present invention that the binders of the aqueous stoving lacquers according to the present invention which are to be produced by the combination of the binder components (a) and (b) contain polyether segments which are incorporated via urethane groups, as well as polyester segments which are incorporated via urethane groups, based on the above-mentioned polyether- or polyester polyols. This means that either component (a) contains at least one polyester segment of this type and component (b) contains at least one polyether segment of this type, or component (a) contains at least one polyether segment of this type and component (b) contains at least one polyester segment of this type, or component (a) and/or component (b) contains at least one polyether segment of this type as well as a polyester segment of this type. Component (a) as well as component (b) preferably each contain at least one polyether and/or polyester segment of this type. More preferably, component (a) contains at least one polyester segment of this type, and component (b) contains at least one polyether segment of this type, or component (a) contains at least one polyether segment of this type and component (b) contains at least one polyester segment of this type. Moreover, at least about 10% by weight, preferably from about 15 to 50%, by weight of polyether segments and at least about 10% by weight, preferably from about 10 to 40%, by weight of polyester segments must be present in the binders produced by the combination of components (a) and (b). The polyester segments are also preferably based on at least about 50% by weight on adipic acid, hexane diol-(1,6) and/or neopentyl glycol in esterified form. In this context, the terms "polyether segments" or "polyester segments" are understood as designating in each case structural units of the type obtained by removing the terminal hydroxyl groups from the above-mentioned polyether- or polyester polyols.

To produce the aqueous stoving lacquers according to the present invention, first of all, either each of the above-described components (a) and (b) is dissolved or dispersed separately in water and then the resulting aqueous solutions or dispersions are mixed together, or the above-mentioned components (a) and (b) are mixed in substance and the resulting mixture is then dissolved or dispersed in water. Of course, it is necessary for the carboxyl groups of the prepolymers (a) and (b) to be neutralized in a sufficient quantity with the above-mentioned bases. If this neutralization has not been carried out during the production of the prepolymers, it may be effected by adding the bases to the prepolymers before they are dispersed, or by adding the bases to the water of dispersion.

Whether solutions or dispersions are obtained after the dispersing operation depends on the content of the combinations of neutralized carboxyl groups. The combination of prepolymers (a) and (b) preferably has a content of from about 20 to 120 mulliequivalents of carboxylate groups ($COO^-$) per 100 g of solids.

During the production of the binders, the individual components (a) and (b) are used in such quantities which correspond to an equivalent ratio of blocked isocyanate groups in (a) to hydroxyl groups in (b) of from about 0.6:1 to 2:1, preferably from about 0:9:1 to 1.5:1.

The components (a) and (b) or the mixtures of (a) and (b) are either dispersed by mixing with water from the melt or by mixing the crushed, solids with water. In the first case, water which has been heated to a temperature of from about 50° to 100° C. is preferably used; whereas, in the second case. water at room temperature is preferably used and the process being carried out for example as described in DE-OS No. 2,642,073. It is possible in each case to add the water to the resins, or to introduce the resins into the water with stirring.

A sufficient quantity of water is used for dispersing, so that the binder dispersions or solutions have a solids content of from about 20 to 70% by weight, preferably from about 30 to 50% by weight. It is possible to further dilute the dispersions or solutions with water at any time.

The last step for the production of the aqueous stoving lacquers according to the present invention preferably comprises working pigments and optionally other auxiliaries and additives conventional in lacquer technology, for example fillers, into the binder dispersions or solutions which have been described. Pigmenting may be carried out directly in the aqueous phase according to the methods which are generally conventional in lacquer technology, i.e by dispersing in a ball mill, a bead mill or in a dissolver.

In principle, it is also possible to work the pigments and/or other auxiliaries and additives which are optionally used into one of the binder components (a) and (b), or into the binder produced by the combination of these components before the aqueous dispersion is produced. However, a method of this type is less preferred.

The conventional pigments and fillers may be worked into the lacquers, as long as they are not water-soluble or do not contain relatively large quantities of water-soluble salts. Examples of such pigments and fillers are as follows: titanium dioxide, iron oxides, zinc phosphate, carbon block, mica, talcum, kaolin, barium sulphate, chalk or metals such as aluminum bronzes.

It is an advantage of the aqueous stoving lacquers according to the present invention that they may be pigmented to a relatively great extent without the disadvantages which would otherwise usually arise in aqueous lacquer systems. Pigment or filler contents of from about 5 to 200% by weight, based on the binder, are generally adjusted. The lacquers preferably contain from about 80 to 140% by weight pigments and fillers, based on the binder solids.

If necessary, the finished lacquers may also be mixed with flow auxiliaries. The organic solvents which have already been described for the production of component (a) are suitable in principle for this purpose. Flow auxiliaries which are also to be used include, for example n-butanol, isobutanol, isopropanol, butylene glycol or other alcohols.

The lacquers according to the present invention which are ready for use generally have solids contents, based on all the solid constituents, such as binders, pigments and fillers, of from about 20 to 80% by weight, preferably from about 40 to 60% by weight.

The aqueous stoving lacquers according to the present invention are outstandingly suitable for the production of lacquer films and coatings on heat-resistant substrates, in particular on metals. An excellent property of these stoving lacquers is the fact that in spite of a high pigmenting, they produce lacquer coatings which simultaneously have good gloss, a high degree of hardness, good elongation and effective adhesion as well as outstanding corrosion prevention.

To produce the coatings, the substrates are coated with the aqueous lacquers according to the present invention by conventional methods, for example by spraying, brushing, dipping, casting or rolling. Thermal hardening generally takes place within a temperature range of from about 8° to 250° C., preferably from about 100° to 180° C., the water being removed from the lacquer films by evaporation or vaporization before or during this heat treatment.

The following Examples further illustrate the present invention. All percentages are based on percent by weight, unless otherwise indicated.

EXAMPLES

EXAMPLE 1

A. Production of a component (a) according to the present invention

An anhydrous mixture of 3.4 g of trimethylol propane and 168 g of a polyester of adipic acid and hexane diol-(1,6) having an OH number of 134 (molecular weight: 840) was added at 60° C. to 222 g of isophorone diisocyanate. The mixture was stirred at 90° C. until the calculated NCO content of 13.5% was attained. 45.2 g of ε-caprolactam were then added. The temperature rose to about 110° C. After the exothermic reaction had subsided, the mixture was diluted with 27 g of N-methylpyrrolidone, and 40.2 g of dimethelolpropionic acid were then added in portions. The mixture was stirred for 30 minutes at 120° C., and then a further 33.9 g of ε-caprolactam were added and the mixture was again stirred for about 30 minutes at 120° C. until it was no longer possible to detect any free NCO groups (IR spectrum). After adding 25.6 g of N,N-dimethyl ethanolamine, a component (a) according to the present invention was obtained in the form of a high viscosity resin.

| | |
|---|---|
| Average molecular weight: | 1830 |
| Average functionality: | 2.33 |
| Content of blocked isocyanate groups (NCO): | 5.4% in the solid substance |
| Content of urethane groups: | 14.0% in the solid substance |
| Content of carboxylate groups: | 52.4 m equiv./100 g solids |
| Content of carboxyl groups: | 2.2 m equiv./100 g solids |

For dispersing, 918 g of demineralized water which were previously heated to 90° C. were added with thorough stirring to the resin which was at 90° C. A stable, slightly opaque, solution-like dispersion was obtained. The solids content was 35% and the Ford cup viscosity (4 mm nozzle) was equivelent to 120 seconds.

B. Production of a component (b) according to the present invention 50 g of N-methyl pyrrolidone, 13.4 g of trimethylolpropane and 46.9 g of dimethylol propionic acid were added to 550 g of an anhydrous polyether of propylene oxide and bisphenol A having an OH number of 202 (molecular weight: 550), and the mixture was heated to 110° C. until it was clear. It was then cooled to 80° C., and 168 g of hexamethylene miisocyanate were added. An exothermic reaction commenced, during which the temperature rose to 100° C. The mixture was stirred for about 1 hour at 100° C. until it was no longer possible to detect any free NCO groups (IR spectrum). After adding 26.7 g of N,N-dimethyl ethanolamine, a component (b) according to the present invention was obtained in the form of a high viscosity resin.

| | |
|---|---|
| Average molecular weight: | 1790 |
| Average functionality: | 2.22 |
| Content of hydroxyl groups: | 2.1% in the solid substance |
| Content of urethane groups: | 14.7% in the solid substance |
| Content of carboxylate groups: | 37.3 m equiv./100 g solids |
| Content of carboxyl groups: | 6.2 m equiv./100 g solids |

For dispersing, 1369 g of demineralized water which were previously heated to 90° C. were added with thorough stirring to the resin which was at 90° C. A stable, slightly opaque, solution-like dispersion was obtained. The solids content was 35% and the Ford cup viscosity (4 mm nozzle) was equivalent to 68 seconds.

C. Production of an aqueous stoving lacquer

A pigmented lacquer having a solids content of 42% and a Ford cup viscosity (4 mm nozzle) of 19 seconds was produced in a bead mill from 140 g of the dispersion produced according to formulation A, 146.7 g of the dispersion produced according to formulation B, 50 g of demineralized water and 70 g of titanium dioxide. The pigment content was 70%, based on the binder. The binder contained 34.7% of polyether segments and 15.1% of polyester segments which were composed exclusively of adipic acid and hexane diol-(1,6).

The lacquer was applied to a degreased steel sheet by spraying and was stoved for 30 minutes at 180° C. The properties of the lacquer coating obtained in this manner were compared in the following Table to those of a lacquer produced according to Example 4 of DE-AS No. 2,507,884.

| | Lacquer acc. to the present invention (Example 1) | Lacquer acc. to DE-AS 2,507,884 |
|---|---|---|
| Extent of pigmenting: | 70% TiO$_2$ | 7.0% TiO$_2$ |
| Layer thickness: | 35 μm | 45 μm |
| Gloss 60° C. (DIN 67 530): | 90 | 88 |
| Pendulum hardness (DIN 53 157): | 143 sec. | 121 sec. |
| Erichsen test (DIN 53 156): | 9.8 mm | 9.2 mm |
| Cross-hatch-test (DIN 53 151): | regular | regular |

The comparison shows that although the aqueous stoving lacquer according to the present invention was pigmented directly in the aqueous phase, it is at least equal to the aqueous lacquer according to DE-AS No. 2,507,884 produced via the organic pigment dispersion, with respect to gloss and mechanical properties.

EXAMPLE 2 (COMPARATIVE EXAMPLE)

An aqueous polyurethane-polyurea dispersion containing a hydrophobic blocked polyisocyanate was produced according to Example 1 of EP-OS No. 75 775 (U.S. Pat. No. 4,452,834), and was pigmented to 70% with titanium dioxide in a bead mill. A stoved lacquer coating produced therefrom (layer thickness: 35 μm) has a gloss (60°) of only 62.

A comparison with the lacquer coating obtained according to Example 1 of the present invention demonstrates the technical advance which is achieved by this invention compared to conventional aqueous polyurethane dispersions.

EXAMPLE 3

The components (a) and (b) according to the present invention were produced according to Example 1 in resin form.

The resins were heated to 90° C. 54 g of resin (a) were then added to 56.4 g of resin (b), and 176.5 g of demineralized water heated to 90° C. were allowed to run into this mixture with through stirring. A finely-divided, stable dispersion was produced which had a solids content of 35%.

A pigmented lacquer having a solids content of 42% was produced in a bead mill from this dispersion with the addition of 50 g of demineralized water and 70 g of titanium dioxide. The pigment content was 70%, based on the binder.

The properties of the stoved lacquer correspond in gloss and mechanical values to those of the lacquer of Example 1.

EXAMPLE 4

A pigmented lacquer having a solids content of 50% was produced in a bead mill from 140 g of the dispersion produced according to Example 1, formulation A, 73.4 g of the dispersion produced according to Example 1, formulation B, 150 g of a pigment mixture of 42.5% of titanium dioxide, 28% of barium sulphate, 28% of calcium carbonate, 0.9% of iron oxide and 0.6% of a standard rheology auxiliary based on silicate (Aerosil R 972, manufactured by Degussa), and 86 g of demineralized water. The pigment content amounted to 200%, based on the binder.

The lacquer was applied to a degreased steel sheet by spraying and was stoved for 30 minutes at 180° C. As a result of the high pigmenting, the lacquer had only a slight gloss, but it still had an extremely good mechanical property spectrum:

| | |
|---|---|
| Extent of pigmenting: | 200% |
| Layer thickness: | 32 μm |
| Pencil hardness: | 5 H |
| Pendulum hardness: | 120 sec |
| Erichsen test: | 8.9 mm |
| Mandrel bending test: (A5TM-D-522-60) | 32% |
| Cross-hatch-test: | regular |

EXAMPLE 5

A. Production of a component (a) according to the present invention

An anhydrous mixture of 13.4 g of trimethylol propane and 168 g of a polyester of adipic acid and hexane diol-(1,6) having an OH number of 134 (molecular weight: 840) was added at 40° C. to 174 g of diisocyanatotoluene (mixture of 65% of 2,4- and 35% of 2,6-isomer). The mixture was stirred at 80° C. until the calculated NCO content of 15.4% was attained. It was then diluted with 70 g of N-methylpyrrolidone, and 79.1 g of ε-caprolactam were then added. After about 1 hour at from 70° to 75° C., the calculated NCO content had fallen below 5,0%. 40.2 g of dimethylol propionic acid were then added and the mixture was stirred for about 1 hour while the temperature was slowly increased to 100° C. Thereafter, it was no longer possible to detect any free NCO groups (IR spectrum). After adding 24.5 g of N,N-dimethyl ethanolamine, a component (a) according to the present invention was obtained in the form of a high viscosity resin.

| | |
|---|---|
| Average molecular weight: | 1660 |
| Average functionality: | 2.33 |
| Content of blocked isocyanate groups (NCO): | 5.9% in the solid substance |
| Content of urethane groups: | 15.4% in the solid substance |
| Content of carboxylate groups: | 55.0 m equiv./100 g solids |
| Content of carboxyl groups: | 5.0 m equiv./100 g solids |

For dispersing, 787 g of demineralized water which were previously heated to 70° C. were added with thorough stirring to the resin wnich was at 100° C. A stable, slightly opaque, solution-like dispersion was obtained. The solids content was 35% and the Ford cup viscosity (4 mm nozzle) was equivalent to 77 seconds.

B. Production of a component (b) according to the present invention 130 g of N-methylpyrrolidone, 13.4 g of trimethylol propane and 46.9 g of dimethylol propionic acid were added to 550 g of an anhydrous polyether of propylene oxide and bisphenol A having an OH number of 202 (molecular weight: 550), and the mixture was heated to 110° C. until it was clear. It was then cooled to 40° C., and 174 g of diisocyanato toluene (mixture of 65% of the 2,4- and 35% of the 2,6-isomer) were added. An exothermic reaction commenced during which the temperature rose to about 75° C. The mixture was stirred for about 1 hour at 80° to 90° C. until it was no longer possible to detect any free NCO groups (IR spectrum). After adding 31.2 g of N,N-dimethylethanolamine, a component (b) according to the present invention was obtained in the form of a high viscosity resin.

| | |
|---|---|
| Average molecular weight: | 1810 |
| Average functionality: | 2.22 |
| Content of hydroxyl groups: | 2.1% in the solid substance |
| Content of urethane groups: | 14.5% in the solid substance |
| Content of carboxylate groups: | 42.9% m equiv./100 g solids |
| Content of carboxyl groups: | 0 m equiv./100 g solids |

For dispersing, 1669 g of demineralized water which were previously heated to 70° C. were added with thorough stirring to the resin which was at 90° C. A stable, slightly opaque, solution-like dispersion was obtained. The solids content was 30% and the Ford cup viscosity (4 mm nozzle) was equivelent to 34 seconds.

C. Production of an aqueous stoving lacquer

A pigmented lacquer having a solids content of 47% was produced in a bead mill from 130 g of the dispersion produced according to formulation A, 175 g of the dispersion produced according to formulation B, 10 g of demineralized water and 98 g of a pigment mixture of 42.5% of titanium dioxide, 28% of barium sulphate, 28% of calcium carbonate, 0.9% of iron oxide and 0.6% of a standard rheology auxiliary based on silicate (Aerosil R 972, manufactured by Degussa). The pigment content was 100%, based on the binder. The binder contained 35.9% of polyether segments and 15.7% of polyester segments which were composed exclusively of adipic acid and hexane diol-(1,6).

The lacquer was applied to a degreased steel sheet by spraying and was stoved for 30 minutes at 180° C. The lacquer coating obtained in this manner had the following properties:

| | |
|---|---|
| Extent of pigmenting | 100% |
| Layer thickness: | 32 μm |
| Gloss 60° (DIN 67 530): | 82 |
| Pendulum hardness (DIN 53 157): | 154 sec |
| Pencil hardness: | 3 H |
| Erichsen test: | 9.2 mm |
| Mandrel bending test (ASTM-D-522-60): | 32% |
| Cross-hatch-test: | regular |
| Salt spray test (DIN 53 167): | 21 d Wd 5 mm |

The Table shows that the lacquer is distinguished by outstanding corrosion prevention properties, in addition to having a good gloss, a high degree of hardness and good elongation. Therefore, the product according to the present invention is suitable for high-grade lacquer, for example in the car sector. For a use of this type, a good adhesion to other lacquer layers is also met as another prerequisite.

| Application: | Grid test: |
|---|---|
| Lacquer acc. to present invention on standard KTL primer | Gt O |
| Standard car cover lacquer on lacquer acc. to present invention | Gt O |

EXAMPLE 6

An anhydrous mixture of 13.4 g of trimethylol propane and 168 g of a polyester of adipic acid and hexane diol-(1,6) having an OH number of 134 (molucular weight: 840) was added at 60° C. to 222 g of isophorone diisocyanate. The mixture was stirred at 90° C. until the calculated NCO content of 13.5% was obtained. 45.2 g of $\epsilon$-caprolactam were then added. The temperature rose to about 110° C. After the exothermic reaction had subsided, a mixture of 40.2 g of dimethylol propionic acid and 40.6 g of N,N-dimethylbenzylamine was added. The mixture was then stirred for about 30 minutes at 120° C., and then a further 33.9 g of $\epsilon$-caprolactam were added and the mixture was again stirred for about 20 minutes at 120° C. until it was no longer possible to detect any free NCO groups (IR spectrum). Thereafter, the melt was poured onto a sheet there it solidified to a vitreous mass upon cooling. The solidified product was crushed mechanically to produce a component (a) according to the present invention in the form of solid pieces.

| Average molecular weight: | 1875 |
|---|---|
| Average functionality: | 2.33 |
| Content of blocked isocyanate groups (NCO): | 5.2% |
| Content of urethane groups: | 13.6% |
| Content of carboxylate groups: | 53.3 m equiv./100 g solids |
| Content of carboxyl groups: | 0 m equiv./100 g solids |

For dispersing, the crushed solid resin was added to a solution at room temperature of 30.6 g of triethylamine in 1148 g of water. The product dissolved over a period of about 2 hours with gentle stirring, and the solution was heated to 40° C. A stable, slightly opaque solution-like dispersion was obtained. The solids content was 30% and the Ford cup viscosity (4 mm nozzle) was equivalent to 28 seconds.

The dispersion may be formulated to produce pigmented aqueous stoving lacquers, for example combined with the dispersion of component (b) from Example 1 according to the present invention and with the pigment mentioned in Example 1C. These lacquers produce glossy, hard lacquer coatings which have high elongation and good adhesion.

EXAMPLE 7

A. Production of a component (a) according to the present invention 192.5 g of an anhydrous polyether of propylene oxide and bisphenol A having an OH number of 202 (molecular weight: 550) were added at 60° C. to 222 g of isophorone diisocyanate. The mixture was stirred at 100° C. until the calculated NCO content of 13.2% was attained, and then 45.2 g of $\epsilon$-caprolactam were added. After the exothermic reaction has subsided, the mixture was diluted with 50 g of N-methyl pyrrolidone, and 40.2 g of dimethylol propionic acid were then added in portions. The mixture was stirred for 30 minutes at 120° C. A further 33.9 g of $\epsilon$-caprolactam were then added and the mixture was stirred again for about 30 minutes at 120° C. until it was no longer possible to detect any free NCO groups (IR spectrum). After adding 26.7 g of N,N-dimethylethanolamine, a component (a) according to the present invention was obtained in the form of a high viscosity resin.

| Average molecular weight: | 1600 |
|---|---|
| Average functionality: | 2 |
| Content of blocked isocyanate groups (NCO): | 5.2% in the solid substance |
| Content of urethane groups: | 13.7% in the solid substance |
| Content of carboxylate groups: | 53.5 m equiv./100 g solids |
| Content of carboxyl groups: | 0 m equiv./100 g solids |

For dispersing, 1169 g of demineralized water which were previously heated to 90° C. were added with thorough stirring to the resin which was at 90° C. A stable, slightly opaque, solution-like dispersion was obtained. The solids content was 30% and the Ford cup viscosity (4 mm nozzle) was equivalent to 20 seconds.

B. Production of a component (b) according to the present invention

A mixture of 425 g of a polyester of adipic acid, hexane diol-(1,6) and neopentyl glycol (molar ratio of hexane diol:neopentyl glycol=1.6:1) having an OH number of 66 (molecular weight: 1700), 100 g of N-methylpyrrolidone, 50.2 g of hexane diol-(1,6), 20.1 g of trimethylol propane and 80.4 g of dimethylol propionic acid were heated to 100° C. until a clear melt was produced. After cooling to 8° C., 168 g of hexamethylene diisocyanate were added and the mixture was stirred at 100° C. until it was no longer possible to detect any free NCO groups (IR spectrum). 49.0 g of N,N-dimethylethanolamine were then added. A component (b) according to the present invention was obtained in the form of a high viscosity resin.

| Average molecular weight: | 1863 |
|---|---|
| Average functionality: | 2.35 |
| Content of hydroxyl groups: | 2.14% in the solid substance |
| Content of urethane groups: | 14.9% in the solid substance |
| Content of carboxylate groups: | 69.4 m equiv./100 g solids |
| Content of carboxyl groups: | 6.3 m equiv./100 g solids |

For dispersing, 1580 g of demineralized water which were previously heated to 80° C. were added with thorough stirring to the resin which was at 100° C. A stable, opaque, finely-divided dispersion was obtained. The solids content was 30% and the Ford cup viscosity (4 mm nozzle) was equivalent to 33 seconds.

C. Production of an aqueous stoving lacquer

A lacquer having a solids content of 42% and an extent of pigment content of 70%, based on solids, was produced in a bead mill from 150 g of the dispersion obtained according to formulation A, 146.3 g of the dispersion obtained according to formulation B and 62 g of titanium dioxide. The binder contained 17.7% of polyether segments and 27.3% of polyester segments which were composed exclusively of adipc acid, hexane diol-(1,6) and neopentyl glycol. A stoved lacquer coating produced therefrom was distinguished by good gloss and by high elongation and elasticity.

EXAMPLE 8

An anhydrous mixture of 13.4 g of trimethylol propane and 168 g of a polyester of adipic acid and hexane diol-(1,6) having an OH number of 134 (molecular weight: 840) was added at 40° C. to 174 g of diisocyanato toluene (mixture of 65% of the 2,4- and 35% of the 2,6-isomer). The mixture was stirred at 80° C. until the calculated NCO content of 15.4% was attained. The mixture was diluted with 100 g of N-methylpyrrolidone, cooled to 40° C. and then 60.9 g of butanonoxime were added dropwise over a period of 15 minutes. After about 30 minutes at 60° C., the calculated NCO content of 4.9% was attained. 40.2 g of dimethylyl propionic acid were then added and the mixture was stirred for about 1 to 2 hours while the temperature was increased to 80° C. Thereafter, it was no longer posssible to detect any free NCO groups (IR spectrum). After adding 30.3 g of triethylamine, a component (a) according to the present invention was obtained in the form of a high viscosity resin.

| Average molecular weight: | 1620 |
| Average functionality: | 2.33 |
| Content of blocked isocyanate groups (NCO): | 6.0% in the solid substance |
| Content of urethane groups: | 15.8% in the solid substance |
| Content of carboxylate groups: | 61.7 m equiv./100 g solids |
| Content of carboxyl groups: | 0 m equiv./100 g solids |

For dispersing, 718 g of demineralized water were added with thorough stirring to the resin which was at 65° C. A stable, finely-divided, opaque dispersion was obtained. The solids content was 35% and the Ford cup viscosity (4 mm nozzle) was equivalent to 18 seconds.

The dispersion may be formulated to produce pigmented aqueous stoving lacquers, for example, in combination with component (b) from Example 1 according to the present invention and with the pigment mentioned in Example 1C. These lacquers produce glossy, hard lacquer coatings having high elongation and good adhesion.

EXAMPLE 9

An anhydrous mixture of 13.4 g of trimethylol propane and 168 g of a polyester of adipic acid and hexane diol-(1,6) having an OH number of 134 (molecular weight: 840) was added at 60° C. to 222 g of isophorone diisocyanate. The mixture was stirred at 100° C. until the calculated NCO content of 13.% was attained. It was then diluted with 100 g of N-methylpyrrolidone, cooled to 50° C. and then a solutio- of 1 g of sodium phenolate in 123 g of malonic acid diethylester was added. The mixture was stirred for about 1 hour at 80° C. until the calculated NCO value of 3.5% was attained. 40.2 g of dimethylol propionic acid were then added and were left to react for about 6 hours at 80° C. Thereafter, it was no longer possible to detect any free NCO groups (IR spectrum). After adding 30.3 g of triethylamine, a component (a) according to the present invention was obtained in the form of a high viscosity resin.

| Average molecular weight: | 1990 |
| Average functionality: | 2.33 |
| Content of blocked isocyanate groups (NCO): | 4.9% in the solid substance |
| Content of urethane groups: | 12.8% in the solid substance |
| Content of carboxylate groups: | 50.2% m equiv./100 g solids |
| Content of carboxyl groups: | 0 m equiv./100 g solids |

For dispersing, 1195 g of demineralized water were added with thorough stirring to the resin which was at 70° C. A finely-divided, solution-like dispersion was obtained having a solids content of 30% and a Ford cup viscosity equivalent to 25 seconds.

The dispersion may be used for the production of pigmented aqueous stoving lacquers, for example in a combination with component (b) from Example 1 according to the present invention and with the pigment mentioned in Example 1C. The lacquer coatings which may be obtained with the stoving lacquers have good gloss, a high degree of hardness, high elongation and good adhesion.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous stoving lacquer containing pigments and/or filters wherein the binder comprises
    (a) a polyether and/or polyester urethane prepolymer having blocked isocyanate groups, an average functionality (based on the blocked NCO groups) of from about 1.8 to 5, an average molecular weight of about 500 to 10,000, a content of blocked isocyanate groups (calculated as NCO) of about 2 to 15% by weight, a content of urethane groups (calculated as —NH—CO—O) of about 5 to 30% by weight and a content of chemically incorporated, at least partially neutralized carboxyl groups of about 10 to 180 milliequivalents per 100% grams of solids, and
    (b) a polyether and/or polyester uretnane prepolymer having free alcoholic hydroxyl groups, an average hydroxyl functionality of about 1.8 to 5, an average molecular weight of about 500 to 10,000, a content of alcoholic hydroxyl groups of about 0.5 to 10% by weight, a content of urethane groups (calculated as —NH—CO—O—) of about 5 to 30% by weight and a content of chemically incorporated, at least partially neutralized carboxyl groups of about 10 to 180 milliequivalents per 100 grams of solids, wherein said binder is further characterized by
(i) components (a) and (b) being present in quantities corresponding to an equivalent ratio of blocked isocyanate groups to hydroxyl groups of about 0.6:1 to 2:1,
(ii) the total quantity of neutralized carboxyl groups being sufficient for the binder to be dispersible or soluble in water,
(iii) the polyether and polyester segments each being present in a total quantity of at least 10% by weight, based on the weight of said binder and
(iv) said polyether segments containing at most 10% by weight of ethylene oxide units, $CH_2-CH_2-O$.

2. The aqueous stoving lacquer of claim 1 wherein at least 50 carboxyl equivalent percent of the carboxylic acids used to prepare the polyester segments are based on adipic acid, and at least 50 hydroxyl equivalent percent, based on all of the polyhydroxyl compounds used in the production of the polyester segments are based on hexane diol-(1,6) or neopentyl glycol.

3. The aqueous stoving lacquer of claim 1 wherein said polyether segments contain at least 50% by weight of propylene oxide units.

4. The aqueous stoving lacquer of claim 2 wherein said polyether segments contain at least 50% by weight of propylene oxide units.

5. Films or coatings prepared from the aqueous stoving lacquer of claim 1.

6. The aqueous stoving lacquer of claim 4 wherein either component (a) or component (b) is prepared from a polyester based on adipic acid and either hexane diol-(1,6) or a mixture of hexane diol-(1,6) and neopentyl glycol, and the remaining component is prepared from a polyether produced by the addition of propylene oxide to bisphenol A.

* * * * *

UNITED STATES PATENT AND TRADEMARK OFFICE
CERTIFICATE OF CORRECTION

PATENT NO. : 4,608,413

DATED : August 26, 1986

INVENTOR(S) : Klaus Nachtkamp et al

It is certified that error appears in the above—identified patent and that said Letters Patent is hereby corrected as shown below: Title page:

At [75] Karl-Ludwig Nobel to --Karl-Ludwig Noble--.

At Column 2, line 39 correct inter alia to --inter alia--.

At Column 3, lines 20-21 correct -N-H to ---NH---.

At Column 4, Line 35 correct isocyanatohexyl- to --isocyanatohexyl)---.

At Column 4, line 36 correct )isocyanurate to --isocyanurate--.

At Column 5, line 42 correct polyester to --polyols--.

At Column 5, line 52 correct (1 8) to --(1,8)--.

At Column 5, line 62 correct a to --as--.

At Column 6, line 1 correct octate to --octane--.

At Column 6, line 19 correct dimethyloyproprionic to --dimethylolpropionic--.

At Column 7, line 2 correct ptoportions to --proportions--.

At Column 7, line 5 correct isocyacate to --isocyanate--.

At Column 7, line 29 correct isocyanane to --isocyanate--.

At Column 7, line 63 correct ditail to --detail--.

At Column 9, line 38 correct 0:9:1 to --0.9:1--.

At Column 10, line 46 correct 8° to --80°--.

At Column 10, line 59 correct 3.4 to --13.4--.

At Column 11, line 2 correct furtner to --further--.

At Column 11, line 36 correct miisocyanate to --diisocyanate--.

At Column 12, line 18 correct 7.0% to --70%--.

At Column 12, line 57 correct through to --thorough--.

UNITED STATES PATENT AND TRADEMARK OFFICE
CERTIFICATE OF CORRECTION

PATENT NO. : 4,608,413

DATED : August 26, 1986

INVENTOR(S) : Klaus Nachtkamp et al

It is certified that error appears in the above—identified patent and that said Letters Patent is hereby corrected as shown below:

At Column 13, line 26 correct A5TM to --ASTM--.

At Column 13, line 65 correct wnich to --which--.

At Column 14, line 27 correct 42.9% to --42.9--.

At Column 15, line 22 correct molucular to --molecular--.

At Column 15, line 36 correct there to --where--.

At Column 16, line 51 correct 8°C to --80°C--.

At Column 16, line 12 correct has to --had--.

At Column 18, line 3 correct 13.% to --13.5%--.

At Column 18, line 5 correct solutio- to --solution--.

At column 18, line 24 correct 50.2% to --50.2--.

At Column 18, line 49 correct filters to --fillers--.

At Column 18, line 60 correct 100% to --100--.

At Column 18, line 62 correct uretnane to --urethane--.

Signed and Sealed this

Twenty-third Day of February, 1988

Attest:

DONALD J. QUIGG

Attesting Officer

Commissioner of Patents and Trademarks